FIG. I

Inventor.
Norman F. Andrews
By C.T. Parker
Attorneys

Jan. 2, 1951 N. F. ANDREWS 2,536,147
SELF-PROPELLED CORN PICKER VEHICLE
Filed Oct. 16, 1947 2 Sheets-Sheet 2

Inventor.
Norman F. Andrews

Patented Jan. 2, 1951

2,536,147

UNITED STATES PATENT OFFICE 2,536,147

SELF-PROPELLED CORN PICKER VEHICLE

Norman F. Andrews, Moline, Ill., assignor to Deere & Company, Moline, Ill., a corporation of Illinois Application October 16, 1947, Serial No. 780,241

8 Claims. (Cl. 180—53)

This invention relates to a vehicle and more particularly to a vehicle especially adapted for the attachment of or carrying of agricultural implements of the harvester type such as corn pickers, combines or the like.

The invention is primarily concerned with the provision of an improved vehicle adapted for carrying an implement and thereby eliminating the need for constantly mounting and dismounting implements from a tractor according to the type of work to be performed. Although many implements and machines are especially provided for easy attachment to or mounting on tractors, this program is relatively expensive inasmuch as a successful adaptation of this program requires a tractor for carrying such machinery and a separate tractor for general purposes about the farm. According to the present invention the implement-carrying tractor may be dispensed with and replaced with a self-propelled vehicle that is considerably more economical than a tractor and one which is more flexibly designed to accommodate the mounting of a wide variety of implements, particularly implements or machines of the harvester type. The great saving in cost of a machine constructed according to the principles of the present invention over the cost of a tractor is achieved because of the elimination of many of those characteristics of a tractor found unnecessary in the use of a tractor with a mounted harvester. Moreover the vehicle constructed according to the present invention is designed on the basis of necessary wheel base and wheel tread, and further includes the necessary supporting structure for attachment of the harvester or like implement, thereby eliminating the necessity of providing, as is the case when the harvester is mounted on a tractor, expensive and complex structure adapting the implement to the tractor. Still further, the vehicle may be designed with a view toward providing a suitable power shaft readily adaptable to the drivable part of the implement.

The invention is further characterized by the provision of a frame structure that is relatively simple in design yet includes structural members so arranged as to provide wide flexibility of the vehicle in operation, the structural members being so associated as to impart rigidity to the structure while permitting relative movement between certain structural parts as the vehicle travels over varying ground contours. In this respect, it is an object of the invention to provide the vehicle with a chassis or frame comprising a pair of articulately connected frame sections, each of which is independently wheel supported and one of which provides means for carrying the vehicle power plant and operator's control station, and the other of which carries in part means for mounting the implement or harvesting machine, the remainder of this means being carried on the first frame section. The arrangement is such that the implement is suitably carried in position for vertical floating and adjustment irrespective of the relative position of the frame sections. The invention is further featured by the provision of an improved driving means between the vehicle power plant or power source and drivable parts of the harvester. In this respect it is an object of the invention to provide a structural supporting member for carrying an implement, and to provide this member preferably in the form of a tube or enclosure member within which are housed certain parts of the driving mechanism.

The foregoing and other important objects and desirable features encompassed by and inherent in the invention will become apparent as the disclosure is more fully made in the ensuing description and accompanying sheets of drawings, wherein there is shown, by way of example, a preferred form of the invention.

Figure 1:
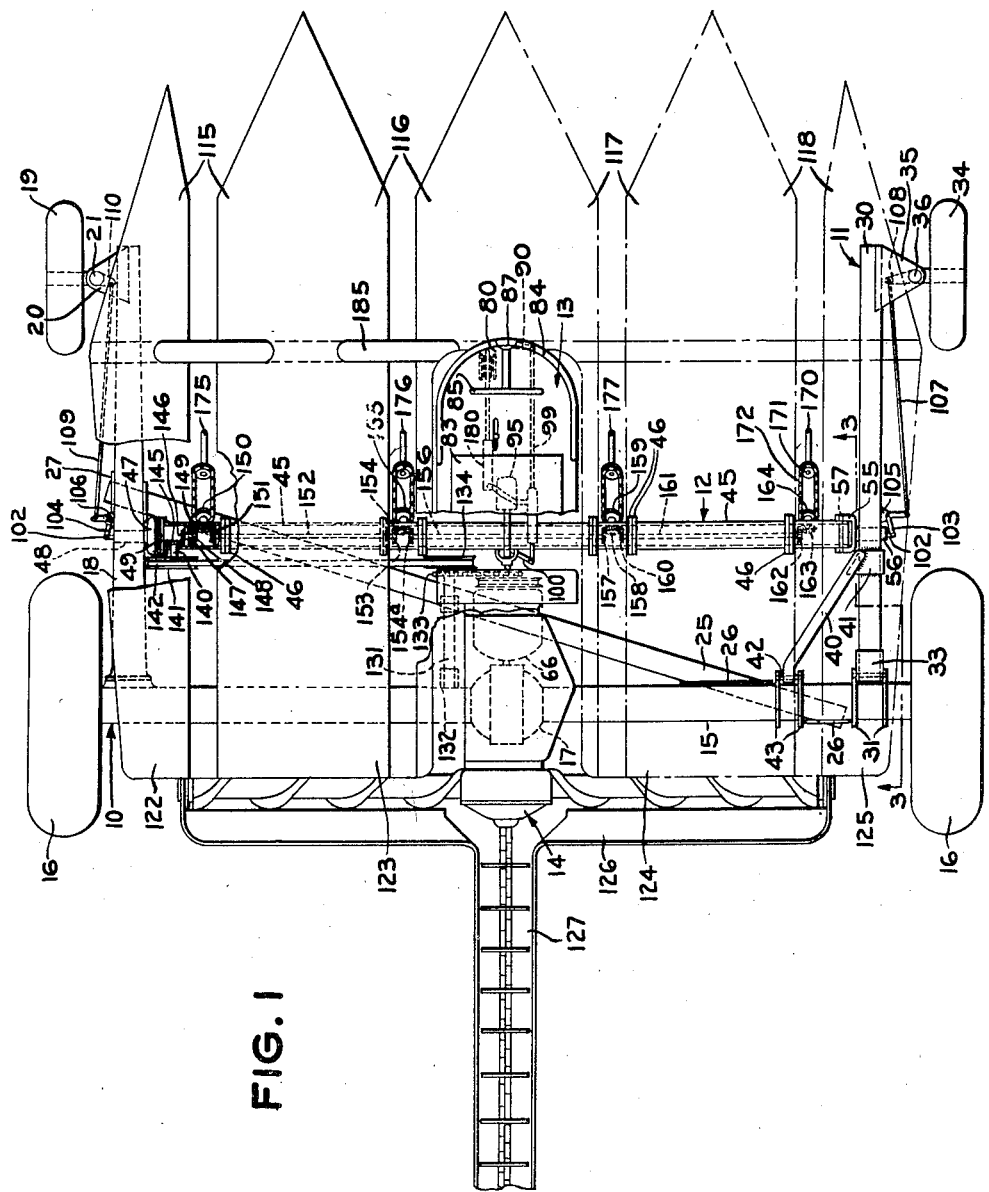
Figure 1 is a plan view of the vehicle including a harvester of the corn picker type mounted thereon.

For the purposes of clarity and simplicity, reference will be had to certain parts of the vehicle as comprising front or rear parts; however, it is to be understood that the terms are not to be construed as limiting the invention to the exact structure shown, for, obviously, the parts may be interchanged and the vehicle operated in the opposite direction for the purpose of accomplishing the same or similar results, according to the type of machine used as part of the vehicle unit.

The vehicle comprises essentially a first wheeled frame section 10 preferably L-shaped in appearance, and a second floating wheeled frame section 11 connected to the frame section 10. The connection between the two frame sections provides for relative articulation between the frames. A transverse implement supporting means comprising a transverse tubular member or element 12 is supported on opposite end portions on the frame sections 10 and 11 so as to carry an implement or machine, here shown as a corn picker of the four-row type, detailed reference to which will be made subsequently. The connection between the tubular implement supporting member 12 and the chassis is such as to accommodate relative vertical movement between the frame sections 10 and 11 and at the same time to stabilize said sections laterally. An operator's station 13 is carried on the frame section 10 independently of the transverse member 12 and independently of the frame section 11, thereby being considered a rigid part of the first frame section. Likewise, the first frame section 10 carries a power plant, designated generally by the numeral 14, which includes power transmitting means for conveying power to drivable parts of the implement, detailed reference to which will be made later.

Figure 3:
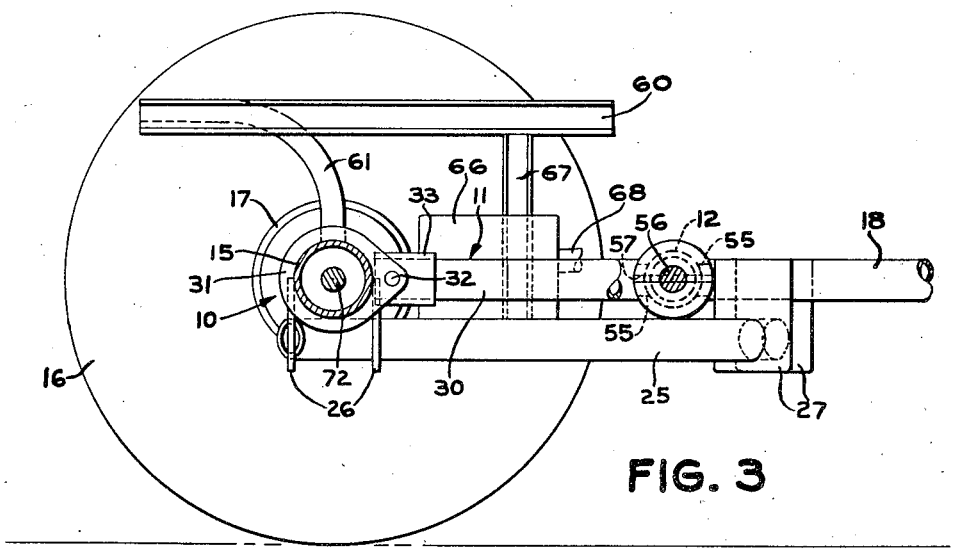
Figure 3 is an enlarged fragmentary view of rear portions of the frame structure, the view being taken substantially along the line 3—3 of Figure 1.

The frame section 10 includes a transverse element in the form of an axle housing structure 15 carried at its opposite ends on traction wheels 16 and provided intermediate its ends with a differential gear housing 17, which may contain differential gearing of conventional construction, details of which have not been illustrated. At its left hand side the frame section 10 includes a fore and aft extending structural member or side arm 18, rigidly secured at its rear end to the left hand end of the axle structure 15 and having its forward end supported on a suitable wheel 19. The connection between the side arm 18 and its associated steerable wheel 19 is here shown as being accomplished by a bracket 20 and a vertical spindle 21. The structural member or side arm 18 and the transverse axle housing 15 are so arranged and secured together as to form the legs of the L-shaped frame section 10. The structural members are suitably and rigidly braced by a diagonal bracing member 25 secured at its opposite ends respectively to the right hand end portion of the axle housing 15 and to an intermediate portion of the side arm 18. The connection between the member 25 and the axle housing 15 is preferably made by means of a pair of plates 26 welded to the axle housing and depending therefrom and at that point welded to the diagonal member 25. The intermediate portion of the side arm 18 has secured thereto, preferably by means of welding, a pair of depending plates 27 to the lower ends of which is secured the left hand end of the diagonal brace member 25. The plates 26 and 27 are preferably apertured so that the diagonal member 25 may pass therethrough (Figure 3).

The second frame section 11 comprises essentially a longitudinally extending side arm 30 having its rear end in close proximity to the right end portion of the axle housing or structure 15 and having its forward end substantially in transverse alinement with the forward end of the left hand side arm 18. The rear end portion of the side arm 30 is connected to the right hand end portion of the axle structure 15 by means providing for relative vertical movement between the arm 30 and the frame section 10 in a longitudinal vertical plane. This articulate connection is preferably accomplished by means of a pair of plates 31 preferably welded to the right hand end portion of the axle structure 15 and extending forwardly therefrom and having a transverse pivot pin 32 on which is carried a sleeve or collar 33 rigidly secured to the rear end portion of the longitudinal side arm 30. The forward end of the side arm 30 is carried on a steerable wheel 34. The connection between the wheel 34 and the side arm 30 is preferably achieved by means of a bracket 35 and a vertical spindle 36, a construction that is similar to that described in respect to the connection of the left hand wheel 19 to the left hand side arm 18. The arm 30 is suitably braced against undesirable lateral displacement by means of a short diagonal brace 40 rigidly secured at one end, as by welding at 41, to an intermediate portion of the arm 30 and having its other end pivoted at 42 to a pair of plates 43 rigidly carried by the rear axle structure 15 just to the left of the plates 31 previously described (Figure 1).

The left and right hand side arms 18 and 30 are cross connected by or carry therebetween the implement-supporting member 12, which is located a substantial distance rearwardly of the front ends of the side arms to provide a substantial space for receiving an implement, as described subsequently. As previously stated, the member 12 is preferably tubular in construction and is here shown as comprising a plurality of separable sections 45 arranged in axial alinement and preferably provided with flanges 46 at their opposite ends by means of which the sections may be rigidly connected together. The transverse member 12 is connected at its left hand end to an intermediate portion of the left hand side arm 18, the connection being preferably accomplished by means of an inwardly facing yoke 47 having a shaft or shank portion 48 carried by the arm 18. The yoke 47 is preferably rigid with the shank or shaft portion 48 and the latter is mounted in the arm 18 for rotation about a transverse axis. The proximate end of the tubular member 12 is suitably pinned to the yoke 47 on a pivot pin 49 arranged on a longitudinal axis, the relationship between the left hand end of the tubular member 12 and the left hand side arm 18 being such that the tubular member 12 may rock about the axis of the shank 48 and also oscillate about the axis of the pivot pin 49. The opposite or right hand end of the tubular member 12 is similarly connected to an intermediate portion of the right hand side arm 30, the connection being made by a yoke 55 having a shank or shaft portion 56 mounted in the arm 30 for rotation about a transverse axis. The yoke is pinned to the right hand end of the member 12 on a pivot pin 57 disposed on a longitudinal axis, so that the connection is similar to the connection 47—48—49 at the left hand side of the chassis. By the means just described the transverse member 12 accommodates relative movement between the frame sections 10 and 11.

Figure 2:
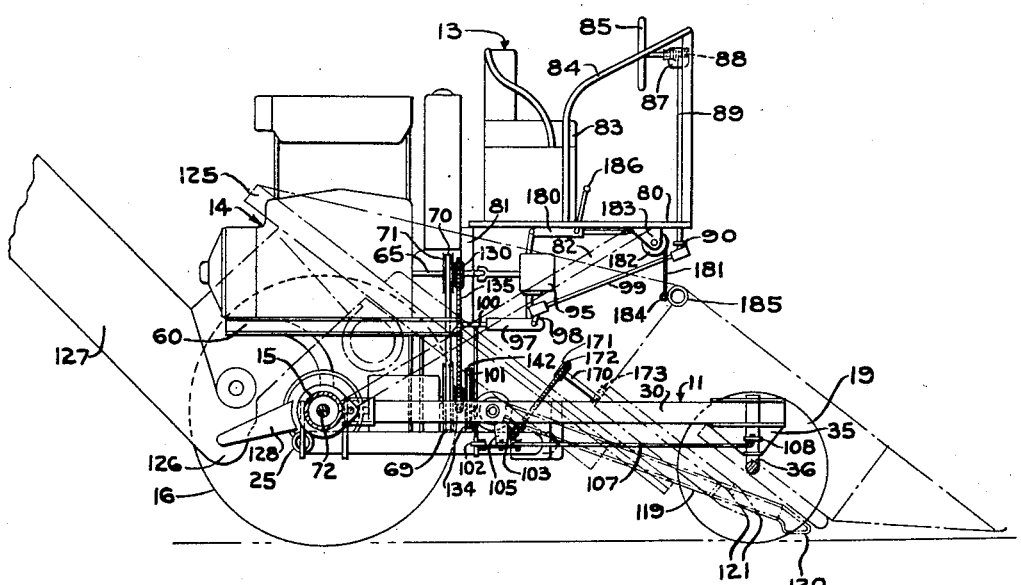
Figure 2 is a side elevation of the structure shown in Figure 1, the near wheels of the vehicle having been removed.

The rigid or L-shaped frame section 10 is provided with supporting structure including means for supporting the power plant 14. This means preferably takes the form of a plurality of frame members 60 suitably supported by other frame members 61 in position above the differential gear housing 17, the frame members 60 extending longitudinally of the frame section 10 to a point just rearwardly of the transverse frame member or implement attaching element 12 (Figures 2 and 3). The power plant shown here is an internal combustion engine and is only one of several types that could be used. This engine is substantially balanced over the rear axle and may include a forwardly extending power shaft 65 which is preferably a continuation of the engine crank shaft. Just ahead of the differential gear housing 17 is a transmission housing 66 suitably suspended by frame members 67 from the engine supporting frame members 60. The housing 66 may contain change speed gearing (not shown) of conventional type and these may be connected in the usual manner to the gearing in the differential gear housing 17. Projecting from the forward end of the change speed gear housing 66 is a driven shaft 68 on which is keyed a belt pulley 69. An endless belt 70 is trained about the pulley 69 and about a driving pulley 71 keyed to the engine shaft 65. In this manner power from the engine 14 is transmitted to the rear traction wheels 16, each of the rear traction wheels being connected to the differential gearing in the usual manner, by mechanism including drive shafts or axles 72 housed within the transverse axle structure 15 (only one of the axles being illustrated in the drawing).

The operator's station 13 includes a longitudinally forwardly extending horizontal platform 80 which provides superstructure supported at its rear end by vertical frame members 81 secured to forward end portions of the engine supporting frame 60 and forming part of that supporting structure. The forward end portion of the platform 80 is at a level substantially above the transverse member 12 and is braced by rearwardly and downwardly inclined bracing members 82 secured at their rear ends to an intermediate portion of the transverse axle structure 15. It will be noted that the operator's station is carried wholly on the frame section 10 and has no connection with either the transverse implement supporting member 12 or the right hand side arm 30. This construction is provided so that there will be no interference between the operator's station and the member 12 or side arm 30, whereby free floating movement of the latter two elements is provided for. The operator's station is provided further with a seat 83 positioned adjacent the rear end of the platform 80 and rearwardly of a guard rail 84 which is provided around the forward end and forward side portions of the platform 80. A steering member or wheel 85 is positioned conveniently ahead of the seat 83 and is supported at the upper end of a steering support 86, the upper portion of which is provided as a housing 87 enclosing worm gear mechanism 88 (Figure 2) for the purpose of operating a vertical steering shaft 89 which projects downwardly at the front end of the platform 80. The shaft at this point has secured thereto a laterally extending steering arm 90.

The steering arm 90 is used to connect the steering wheel 85 with steering mechanism for the front steerable wheels 19 and 34. The steering mechanism illustrated here is of the hydraulic type; although, it is obvious that any other type of steering means may be employed. The mechanism here disclosed includes a hydraulic pump 95 driven by a shaft 96 suitably connected to an extension of the engine shaft 65. The pump 95 supplies fluid under pressure to a piston and cylinder assembly 97 suitably carried by the diagonal brace 82 between the platform 80 and the rear axle housing structure 15. The cylinder may be of the valved type including a control arm 98 connected by a link 99 to the steering control arm 90. The piston and cylinder assembly is suitably connected to a laterally extending arm 100 keyed to the upper end of a vertical shaft 101 which has its lower end extending below the transverse tubular implement supporting member 12, at which point the arm carries means for connection to a transversely extending tie rod the opposite ends of which are visible at 102 in Figure 1. The end portions 102 of the tie rod are pivotally connected to bell cranks 103 and 104, the bell crank 103 being pivoted on a bracket 105 on the right hand side arm 30 and the bell crank 104 being pivoted on a similar bracket 106 on the left hand side arm 18 (Figure 1). The bell crank 103 is connected by a longitudinally extending link 107 to an arm 108 keyed to the spindle 36 of the right hand front wheel 34. The left hand bell crank 104 is similarly connected by a longitudinally extending link 109 to an arm 110 keyed or otherwise secured to the vertical spindle 21 of the left hand steerable wheel 19. The particular type of steering means employed forms no part of the present invention and the illustration thereof is rather schematic. It will be understood, of course, that in a practical construction the connections between the various links and arms will be sufficiently flexible to permit relative movement between the frame sections 10 and 11 as the sections rise and fall according to varying ground contour. It is important, however, that the transverse connections including the end portions 102 be relatively close to the transverse tubular member 12, since the latter is on a principal axis of twisting of the frame sections and the close proximity of the transverse steering connection eliminates as far as possible variations in the steering control that may occur as the frame sections move vertically relative to each other. Other incidents of construction and design will undoubtedly occur to those skilled in the art and it is not desired that the invention be limited in any way by the disclosure of the particular type of steering mechanism shown and described here.

As previously stated the harvester shown in connection with the vehicle is a corn picker of the four row type, although any other type of harvester or corn picker of fewer rows could be used. Accordingly, the disclosure of the picker unit is rather schematic and is intended more as a representation of how such pickers can be used in connection with the vehicle than a specific disclosure of a particular type of machine. With this in mind it will be noticed that the picker includes a plurality of sections or units capable of handling four corn rows simultaneously, provision being made between adjacent sections, as at 115, 116, 117 and 118, for handling four corn rows. The picker sections 115–118 may be mounted on a plurality of downwardly and forwardly inclined supporting or frame members, an example of which is shown at 119 in Figure 2. The lower end of each member 119 may be provided with a ground engaging runner or shoe 120 and its other end includes suitable connection with the transverse tubular member 12 providing for vertical movement of the sections 115–118 about a transverse axis, which in the present case passes through or is coincident with the axis of the member 12. Each picker section may include the usual snapping rolls, an example of which is indicated by the numeral 121 in Figure 2. Each of the picker sections 115–118 may include an ear forwarding elevator that leads upwardly and rearwardly over the rear axle structure 15, these elevator portions being indicated in Figure 1 by the numerals 122—125. These elevators discharge downwardly into a transverse trough or hopper 126 with which is associated in the conventional manner a rearwardly and upwardly inclining wagon elevator 127, the latter being appropriately supported, as at 128, by the rear axle housing structure 15.

As above, the following description of the means by which the drivable parts of the picker are driven from the power plant 14 will be illustrated and described only generally, the main purpose being to illustrate how, in one manner, the desired result may be accomplished. The disclosure in this respect, then, being only representative, will also be relatively schematic. For example, the engine shaft 65 may have keyed thereto a driving sprocket 130. A shaft 131 (Figure 1), having its axis parallel to the axis of the engine shaft 65, is suitably journaled in bearings 132 along the left side of the transmission or change speed gear housing 66. This shaft carries at its forward end a sprocket 133 and a belt pulley 134. The mounting of the shaft 131 is independent of the tubular member 12 to the extent that the shaft 131 is supported entirely on the frame section 10. The sprocket 133 is connected by a driving chain 135 to the driving sprocket 130 on the engine shaft 65.

The left hand end of the transverse member 12 journals a longitudinally extending short shaft 140, which extends rearwardly and has keyed thereto a belt pulley 141. A belt 142 is trained about the pulley 141 and also about the pulley 134 on the shaft 131. The shaft 140 is thus located in close proximity to the pivot pin 47 providing the horizontal pivot axis in the connection between the left hand end of the member 12 and the left hand side arm 18. This arrangement permits the driving parts to accommodae relative movement between the member 12 and the rigid frame section 10 without shortening of the driving belt 142, it being noticed that the drive pulley 134 is carried on the frame section 10 and the drive pulley 141 is carried on the relatively movable member 12. In this respect, it should be further noted that a perfect design might include the mounting of the shaft 140 directly on the left hand side arm 18. However, as will appear immediately, such design would not accommodate the type of driving mechanism hereinafter to be described.

The shaft 140 has keyed thereto inside the left hand end portion of the tubular member 12 a bevel gear 145. This bevel gear meshes with and drives a second bevel gear 146 carried on a short shaft 147 which has keyed thereto another bevel gear 148. The bevel gear 148 is in constant mesh with and drives a bevel gear 149 rotatable on a forwardly and slightly downwardly inclined axis. The bevel gear 149 may be suitably connected by a short shaft to a sprocket 150 located outside the tubular member 12, the shaft between the gear 149 and sprocket 150 passing through a wall of the member 12.

The bevel gear 149, inside the tubular member 12, meshes with a bevel gear 151 carried on a shaft 152 journaled in the member 12. As previously stated, the member 12 is made up of a plurality of coaxial sections 45. The shaft 152 extends to the right to the proximate section 45 and carries at its right hand end a bevel gear 153, which meshes with a bevel gear 154 carried on a short shaft at the other end of which is keyed a sprocket 155, the arrangement being very similar to the arrangement between the bevel gear 149 and sprocket 150 previously described. The sprocket 150 and the sprocket 155 provide power take-off means and are utilized for the purpose of driving parts of the picker, as will hereinafter appear.

The bevel gear 154 is in mesh with and drives a bevel gear 154a carried on a transverse shaft 156 journaled in the second adjacent section 45 of the member 12 and extending coaxial with the shaft 152. The right hand end of the shaft 156 carries a bevel gear 157 which meshes with a bevel gear 158 within the next adjacent section 45 of the member 12. The bevel gear 158 is carried on a short shaft which extends outside the member 12 and has keyed thereto a sprocket 159, the bevel gear 158 being associated with the sprocket 159 in the same manner as the corresponding parts previously referred to. Inside the member 12 the bevel gear 158 meshes with and drives a bevel gear 160 keyed to a shaft 161 extending coaxial with respect to the shaft 152 and 156 and is journaled in the next adjacent section 45 of the tubular member 12. The shaft 161 extends to the right and has at its right end a bevel gear 162 which meshes with a bevel gear 163, the latter being connected by a short shaft which extends through the wall of the tubular member 12 and carries a sprocket 164 thereon. By the means just described, the drive is carried from the power plant 14 through the shaft 65 to the left hand end of the tubular member 12 and then back again to the right hand end of the member 12, the drive being divided at intervals for the purpose of driving the harvester parts, as will presently appear.

As best shown in Figure 2, one of the snapping rolls 121 of the right hand picker section 118 includes a rearwardly and upwardly extending shaft 170 at the upper end of which is keyed a sprocket 171. This sprocket may be connected by a driving chain 172 to the adjacent driving sprocket 164. As is customary the snapping rolls are geared together, as at 173, to provide for rotation thereof in opposite directions. The other sets of snapping rolls (not illustrated) may be similarly driven, there being indicated in Figure 1 input shafts 175, 176 and 177, respectively, for the picker sections 115, 116, and 117, each of which shafts includes a driving sprocket which may be connected by a chain to the adjacent drive sprockets 150, 154 and 159, respectively.

Other components of the picker that require driving may be driven from the engine shaft 65 through any suitable mechanism, several examples of which are known to those skilled in the art.

The supporting of the harvester on the vehicle chassis by means of the transverse member 12 and frame member 119 is such that the harvester is afforded vertical movement with respect to the chassis, this movement being provided for the purpose of adjusting the points of the picker unit and also for the purpose of allowing the harvester to float relative to the frame as varying ground contour is encountered. There is illustrated in the drawings by way of example one means by which the harvester may be raised and lowered with respect to the ground. As shown, the hydraulic pump 95 supplies fluid under pressure to a cylinder and piston assembly 180, the piston rod of which is connected to a forwardly extending cable 181 that is trained over a pulley or sheave 182 carried on a bracket 183 below a forward portion of the operator's platform 80. The free end of the cable 181 is connected at 184 to a transverse brace member 185 cross connecting the picker sections 115, 116, 117 and 118. The cylinder and piston assembly 180 is preferably of the valved type including a control lever 186 disposed within convenient reach of the operator on the seat 83.

One of the characteristics of the vehicle unit provided is that it may be used with any type of harvester, since the construction is such that the structural members lend themselves readily to adaptation for the purpose of carrying different models and makes of pickers, for example. The particular unit illustrated has been designed with a view toward adapting the unit to pickers of existing types, which pickers, as are well known to those skilled in the art, include frame members corresponding to the members 119, which members are mounted on a transverse pivot which corresponds generally to the transverse implement supporting member 12. The same characteristics are generally present in other implements and little, if any, alterations will be required in such implements or in the vehicle incident to the connection of such implement to the vehicle.

It is not intended that the specific disclosure and particular enumeration of objects and features of the invention should exclude alterations in the construction and design or modifications in the use of the improved vehicle chassis for, obviously, such modifications and alterations may be made without departing from the spirit and scope of the invention, as defined in the following claims.

I claim:

1. A self-propelled vehicle for carrying agricultural implements, comprising: a first frame section including a rear member disposed transversely as respects the line of travel of the vehicle and providing a rear axle structure having traction means at each of its opposite end portions, and a second member extending longitudinally forwardly from one end portion of the rear member and rigidly secured at its rear end to said rear member and having ground-engaging means at its forward end; a second frame section including a member extending longitudinally forwardly from the other end portion of the rear member and pivoted at its rear end to said rear member on a transverse axis for movement relative to the first frame section in a longitudinal vertical plane, and having ground-engaging means at its forward end portion substantially in transverse alinement with the aforesaid ground-engaging means; a transverse element disposed a substantial distance rearwardly of the front ground-engaging means and connected at each of its opposite ends respectively to the longitudinal members by means providing for the aforesaid vertical movement of the second frame section and for laterally stabilizing said longitudinal members, said longitudinal members being otherwise structurally separate to provide a substantial space therebetween and ahead of said transverse element for the disposition of agricultural implements; and a power plant carried by the transverse rear member and sustained thereby independently of the transverse element and independently of the longitudinal member of the second frame section.

2. The invention defined in claim 1, further characterized in that: the transverse element is a tubular structure; driving means is contained within said structure and is operatively connected to the power plant; and said driving means is provided with power take-off means exteriorly of said tubular structure and available for connection to drivable parts of agricultural implements connected to the vehicle.

3. The invention defined in claim 1, further characterized in that: a diagonal brace extends from that end portion of the rear member to which the second frame section is connected to a portion of the first section longitudinal member intermediate its front and rear ends and in proximity to the proximate end of the transverse element so as to lie rearwardly of the implement space; and said brace is connected at each of its opposite ends to the aforesaid member portions and is independent of the transverse element.

4. The invention defined in claim 1, further characterized in that: the power plant extends longitudinally and is substantially balanced over the rear transverse member.

5. A self-propelled vehicle for carrying agricultural implements, comprising: a first frame section including a rear member disposed transversely as respects the line of travel of the vehicle and providing a rear axle structure having traction means at each of its opposite end portions, and a second member extending longitudinally forwardly from one end portion of the rear member and rigidly secured at its rear end to said rear member and having steerable ground-engaging means at its forward end; a second frame section including a member extending longitudinally forwardly from the other end portion of the rear member and pivoted at its rear end to said rear member on a transverse axis for movement relative to the first frame section in a longitudinal vertical plane, and having steerable ground-engaging means at its forward end portion substantially in transverse alinement with the aforesaid ground-engaging means; a transverse element disposed a substantial distance rearwardly of the front ground-engaging means and connected at each of its opposite ends respectively to the longitudinal members by means providing for the aforesaid vertical movement of the second frame section and for laterally stabilizing said longitudinal members, said longitudinal members being otherwise structurally separate to provide a substantial space therebetween and ahead of said transverse element for the disposition of agricultural implements; a power plant carried by the first section; an operator's station carried by the first section; and steering mechanism for the steerable ground-engaging means including a steering member on the operator's station, transverse means closely paralleling the transverse element, and connections between said transverse means and the steerable ground-engaging means.

6. A self-propelled vehicle for carrying agricultural implements, comprising: a first frame section including a rear member disposed transversely as respects the line of travel of the vehicle and providing a rear axle structure having traction means at each of its opposite end portions, and a second member extending longitudinally forwardly from one end portion of the rear member and rigidly secured at its rear end to said rear member and having ground-engaging means at its forward end; a second frame section including a member extending longitudinally forwardly from the other end portion of the rear member and pivoted at its rear end to said rear member on a transverse axis for movement relative to the first frame section in a longitudinal vertical plane, and having ground-engaging means at its forward end portion substantially in transverse alinement with the aforesaid ground-engaging means; a transverse element disposed a substantial distance rearwardly of the front ground-engaging means and connected at each of its opposite ends respectively to the longitudinal members by means providing for the aforesaid vertical movement of the second frame section and for laterally stabilizing said longitudinal members, said longitudinal members being otherwise structurally separate to provide a substantial space therebetween and ahead of said transverse element for the disposition of agricultural implements; supporting structure including frame members carried by and above the rear transverse member and extending forwardly at a level substantially above and independent of the transverse element; a power plant carried by a rear portion of said supporting structure; and an operator's station carried by a forward portion of the supporting structure and thereabove to be clear of the aforesaid space in which implements may be disposed.

7. The invention defined in claim 6, further characterized in that: the power plant is at a level above the rear transverse member and includes a depending gear housing substantially at the level of said rear member.

8. The invention defined in claim 7, further characterized in that: the gear housing depends below the supporting structure and ahead of the rear transverse member and is located behind and independent of the transverse element.

NORMAN F. ANDREWS.

REFERENCES CITED

The following references are of record in the file of this patent:

UNITED STATES PATENTS

| Number | Name | Date |
|---|---|---|
| 666,592 | Atkins | Jan. 22, 1901 |
| 1,256,347 | Meharry | Feb. 12, 1918 |
| 1,737,160 | Johnston | Nov. 26, 1929 |
| 2,152,273 | Otto | Mar. 28, 1939 |
| 2,333,080 | Aasland | Nov. 2, 1943 |